Patented May 10, 1932                                                                          1,857,985

UNITED STATES PATENT OFFICE

GUSTAV TAUBE, OF RIGA, LATVIA, ASSIGNOR OF TWENTY-SIX AND TWO-THIRDS PER CENT TO ISRAEL B. BRODIE, OF NEW YORK, N. Y., TWENTY-SIX AND TWO-THIRDS PER CENT TO SIDNEY MUSHER, OF BALTIMORE, MARYLAND, AND TWENTY-SIX AND TWO-THIRDS PER CENT TO BORIS M. RUBIN, OF SEAGATE, NEW YORK

PROCESS OF MANUFACTURING VARIOUS PRODUCTS FROM CORNSTALKS, SUGAR CANE, AND SIMILAR VEGETABLE MATERIAL

No Drawing.              Application filed August 30, 1930.  Serial No. 479,101.

The present invention relates to a process of manufacturing various cellulose products for paper making or the like and other useful products, from straw, leaves, stems and cobs of cornstalks or cornstalks themselves, sugar cane, bagasse and analogous pithy stalks.

The main object of my invention is to provide a process which will be commercially practical with the highest possible yield and reduced operating cost.

Another object is to produce a pith and cellulose containing mass for the manufacture of paper or the like having a high tearing length, stretching strength and number of double or reverse bendings.

A still further object of this invention is to provide such process which will yield such by-products as alcohol, salts, etc.

Through a number of scientific experiments I have discovered that the processing can be greatly speeded and rendered practical for commercial use with the least consumption of time, work and solvents by causing a rapid solution of the salts and filling of the cells and spaces within and around the fibres with the treating medium, such as cooking lye or the like, and that to obtain this result it is necessary to first evacuate the air from all raw material used as thereby the subsequent solving of the soluble contents of the raw materials is greatly expedited due to the fact that the dissolving agent such as water is caused to rapidly permeate the evacuated raw material and come intimately in contact with the latter.

I have also discovered that after the dissolving agent together with the solved substances is drained off a further evacuation is necessary in order thereby not only to remove the residual liquid and the solved substances but also all air that may still be in the raw material or treating vessel, so that when the treating medium such as the cooking liquid is introduced the latter will readily permeate the material and fill its empty spaces and cells and thereby reduce the period of treatment.

Thus one of the most essential features of my new process is the preliminary and subsequent complete evacuation of the plant substance or raw material, which evacuation, as has been heretofore stated, not only expedites the solution of the soluble parts of said raw material and minimizes the possibility of fermentation, but also renders it possible to employ a single cooking treatment of comparatively short duration instead of repeated and comparatively long cooking treatments, and permits the cooking to be carried on at relatively low temperatures and pressures.

Another feature of my invention is that previous to the cleansing, solving and cooking treatments the raw material is pretreated in a mechanical manner or otherwise in such a manner as to reduce the air and pith contents thereof whereby the subsequent evacuation is greatly enhanced and a saving of the quantity of cooking liquid required is obtained.

A great advantage of the short cooking period resulting as a consequence of the evacuation is the sparing of cellulose fibres and a greater solidity of the final product. This has been established by numerous tests made by me with samples of paper produced according to my new process from pith and cellulose containing pulp made from pure cornstalks. These tests covered the tearing length in both directions, stretching strength in both directions and reverse or double bending of the paper. These tests showed the following results:

Average tearing length in one direction 10850 meters, and in the other direction 8500 meters, thus making a mean tearing length of 9675 meters.

Stretching strength in percent stretch equal to 4.3% in one direction, 3.7% in the other direction, thus equal to a mean stretch of 4%.

Number of reverse or double bendings in one direction was 2507 and in the other direction 1914, thus equal to a mean number of double bendings of 2211. As a maximum number of double bendings in one case I obtained 3801.

With the hitherto used processes when using sugar cane or cornstalk rich in sugar content, several days of soaking were required, as a result of which and of the presence of air and the influence of the surrounding temperature a considerable strong fermentation occurred which resulted in either an entire destruction of the non-cellulose substances or an impairment thereof. With my process however by reason of the evacuation of the air from the plant material and the greatly reduced period of time for the solution of the soluble contents of the plant material, towit: eight to twelve hours, under otherwise identical conditions, the above named evils are entirely avoided or reduced to a minimum.

In addition to the above mentioned advantages of my process I have succeeded in utilizing the soluble ingredients of the plants which are washed out in the first solving or leaching treatment, for obtaining by-products such as alcohol, etc. For example by using material not so rich in sugar content, 4 cubic centimeters of pure alcohol was obtained from 100 grams of stalk and 5% solid salts and other ingredients of diverse kinds.

The products derived from my process may by making a mixture of cellulose and any percentage of pith, be used as filling materials for inferior paper bases, as for example ground wood, without the employment of any other binder such as resin, starch, animal binder, etc. to strengthen the paper. This, of course, results in great economy in the manufacture of paper from the materials.

Further, by the addition of fillers and weight increasing substances such as talcum, heavy spar to the cellulose mass rich in pith content produced by my process, paper can be produced.

By varying the treatment of the cellulose and pith mixture produced according to my process it is also possible to manufacture parchment and parchment material without employing sulphuric acid.

With the above described objcets in view and others which will appear from the following description my invention consists in the novel process hereinafter described and defined in the appended claims.

The cornstalks, sugar cane or other plant material to be used are first sorted to remove therefrom those parts which contain only few fibres and other useless substances. The sorted material with or without the cob, leaves etc. is then subjected to a pressing action or other mechanical treatment between pressure rollers or the like to express therefrom as much as possible the air continued therein. Thereupon the thus treated plants are cut into strips and fibres to suit the particular requirements by suitable means capable of detaching pith from the fibres. Then the poor and undesirable parts of the material are again separated as by conveyors and screens whereby the previously loosened pith is sieved off permitting a more rational use of the cooking liquid and yielding a greater quantity of cellulose fibres by elimination of pith. (A maximum of cellulose fibre could be obtained when all pith, if possible, were removed before the cooking treatment to be presently described). The material then is conveyed to silos either by elevators or other suitable means from which filling of one or more suitably arranged cooking vessels takes place. The thus filled vessels are then hermetically sealed and then evacuated to remove whatever air or gases may be contained in the fibres and pith cells and vessels, as a result of which a comparatively rapid and intimate contact between the material and the solving fluid or liquid is obtained. The filling of said vessel with the solving or leaching liquid is the next step. As a solving liquid warm or cold water may be used, although I have found the former to be more preferable. By utilizing the difference in pressure between the interior and exterior of the vessels the filling operation can be accomplished in my process without the use of any pumps. The solving or leaching fluid or liquid is allowed to remain in the vessels for about eight to twelve hours, depending on the character of the material used for the purpose of dissolving the soluble substances contained therein. The liquid is then drained from the vessels with the dissolved substances and may be led off to a suitable plant for the recovery therefrom of by-products, such as alcohol, yeast, diverse chemical products such as salts for animal fodder, and of other by-products such as citric and tartaric acids.

The vessels are then again reevacuated for the removal of any air, dissolved particles and liquid from the fibre and pith cells whereby a more rapid filling of the pith and fibre cells and spaces with the cooking liquid is effected. The filling of the vessels with the cooking liquid is the next step. As cooking liquid a weak sodium lye solution (about 2% NaOH solution) may be used. In my process the filling of the vessels is effected without any pumps due to a suction action caused by the difference in pressure between the exterior and interior of the vessels. The contents of the vessels are then cooked for about two to three hours and at approximately two to three atmospheres pressure. During the cooking process, of course, the vessels are kept hermetically sealed. The contents of the vessels are then cooled and the cooking lye removed and permitted to flow away as waste or is collected for recuperation therefrom of the NaOH for cooking of other batches of the material and for the recovery of the other chemicals contained therein for use as binders. The remaining cellulose and pith substance in the vessels is then subjected to a further treatment which consists of washing thereof with water or other suitable medium with or without the aid of evacuation as previously described. This subsequent treatment may take place in the same or in another vessel and is used for the removal of the residual lye as well as the cooked or solved pith. The contents of the vessels are then removed and delivered to a so called hollander wherein the same are ground up as desired and bleached if necessary.

The mass resulting from the treatment in said hollander is the desired product and is then ready for further treatment in paper making machines according to requirements. The mass may be thoroughly washed in said machines to remove therefrom all vestiges of pith for the production of alpha cellulose, used in making a very high grade paper, or it may be only partly washed so as to leave varying amounts of pith mixed with the cellulose for use as a pulp in making paper of poorer grade, papier-mâché, pergamyn, paper parchment or other similar material.

The pulp thus prepared in said paper making machines thereafter is led off in sheets which latter while still wet may be cut as desired by knives, whereby smooth edges are obtained, or by fine jets of water flowing under high pressure, whereby rough edges are obtained. If the sheets are cut by the latter means into narrow strips or threads the latter may be twisted or spun to form paper thread. The cut sheets may also be use for various other purposes, as for instance electrical insulation material or the like.

If desired, the cellulose mass produced by my process, when rich in pith content, may be used with or without the addition of pith from the corn cob (which may have been similarly treated) for improving papers made of weaker or inferior base materials, as for instance, ground wood. This can be done by adding said mixture to the base material without any addition of other binder such as starch, resin, alum or animal binder. The paper resulting from the last named treatment has high tearing length, great stretching strength and a high double bending strength.

When the alpha cellulose is made, the removed pith and pith from the cobs may be used as binders for all purposes.

It is understood that I do not wish to limit myself to the details described, nor to the particular products mentioned herein.

What I claim is:

1. A process of producing cellulose products from stalks of corn and similar vegetable material, which includes the step of evacuating the free spaces and cells of the raw material, the subsequent step of dissolving the soluble content of said raw material by treatment in water for eight to twelve hours, then the step of reevacuating the spaces and cells in the undissolved material and then the step of treating said undissolved material in lye solution.

2. A process of producing cellulose products from stalks of corn and similar vegetable material, which includes the step of evacuating the free spaces and cells of the raw material, the subsequent step of dissolving the soluble content of said raw material by treatment in water for eight to twelve hours, then the step of reevacuating the spaces and cells of the undissolved material and then the step of treating said undissolved material for two to three hours in a lye solution.

3. A process of producing cellulose products from stalks of corn and similar vegetable materials which includes the steps of extruding air from the raw material by pressing action, then the step of evacuating the free spaces and cells of the said raw material, then the step of dissolving the soluble content of said raw material in a solving fluid, then the step of reevacuating the spaces and cells in the undissolved material and then the step of treating the said undissolved material in a lye solution.

In testimony whereof I affix my signature.

GUSTAV TAUBE.